United States Patent [19]
Wernick

[11] 3,858,969
[45] Jan. 7, 1975

[54] WIDE SCREEN FORMAL SUPER 8 MOTION PICTURE SYSTEM

[76] Inventor: Saul Wernick, 340 E. 61st St., New York, N.Y. 10021

[22] Filed: July 31, 1973

[21] Appl. No.: 384,305

[52] U.S. Cl............... 352/192, 352/168, 352/239, 226/63
[51] Int. Cl. ............................................ G03b 1/22
[58] Field of Search .......... 352/168, 191, 192, 193, 352/194, 195, 196, 239, 240; 226/63

[56] References Cited
UNITED STATES PATENTS
2,325,335  7/1943  Meyers ............................ 226/63
3,556,648  1/1971  Nozawa .............................. 226/63

Primary Examiner—Monroe H. Hayes
Attorney, Agent, or Firm—Armstrong, Nikaido & Wegner

[57] ABSTRACT

A wide screen format Super 8mm motion picture system is provided in which standard Super 8 film cartridges are used. The frame size is the same width, but one half of the height of standard Super 8 frames. The system uses two pull-down claws, each claw pulling the film one half of the distance that it is normally moved in a standard Super 8 system. The shutter is coordinated with the pull-down claws such that the film is exposed after each claw has moved the film.

3 Claims, 6 Drawing Figures

PATENTED JAN 7 1975
3,858,969
SHEET 1 OF 2
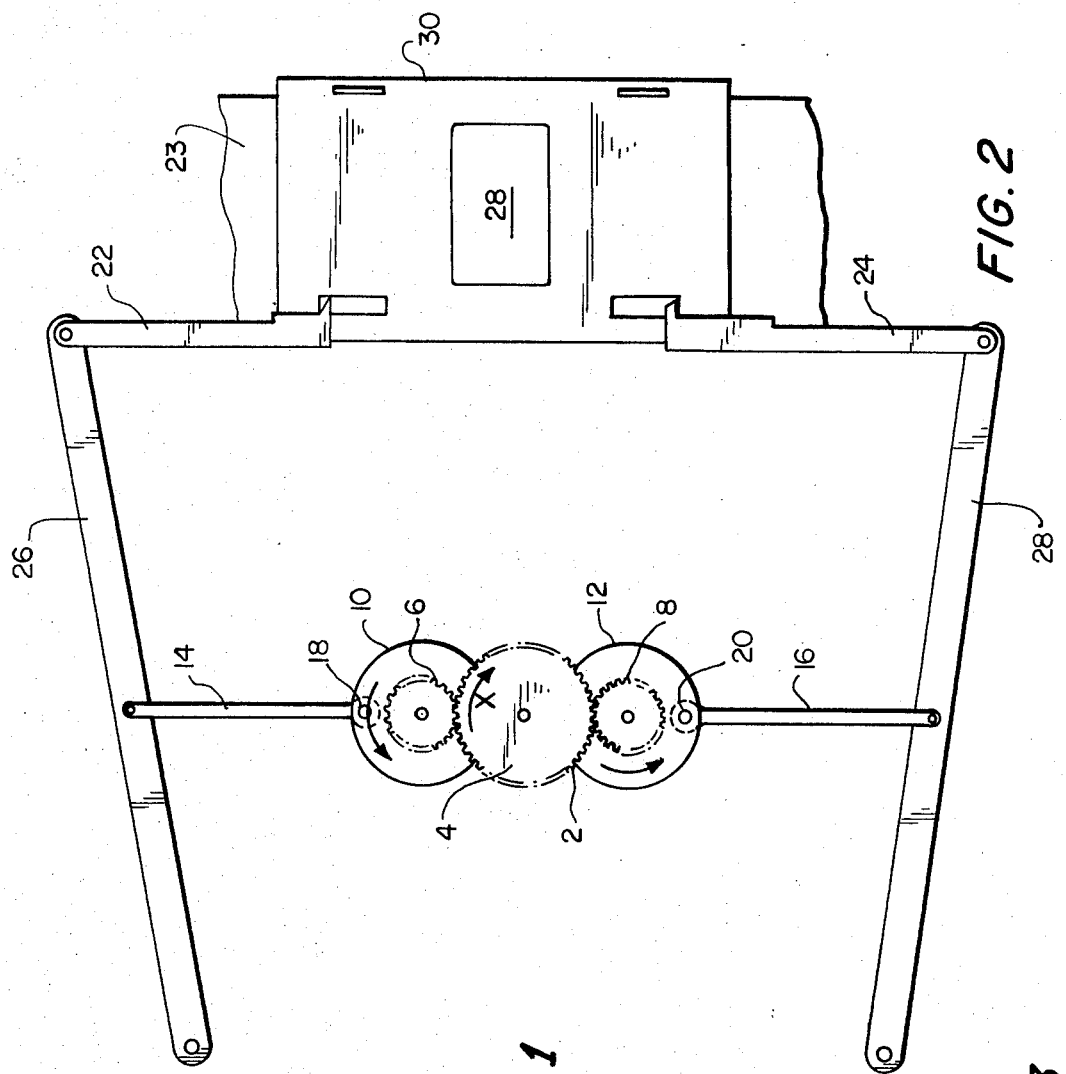
FIG. 2
FIG. 1
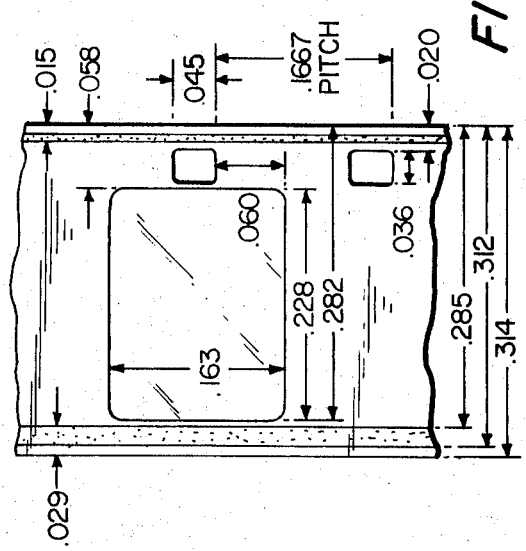
FIG. 3
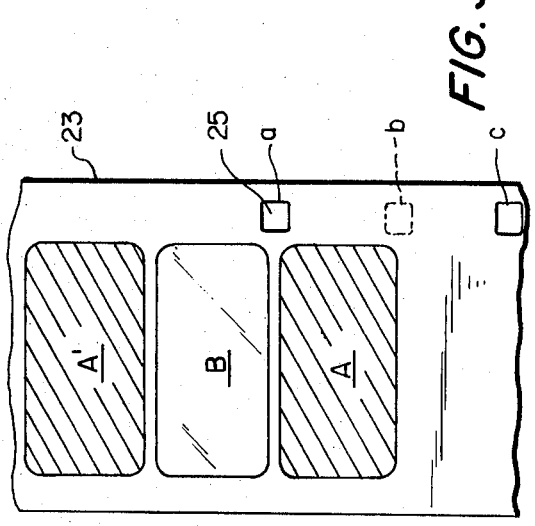

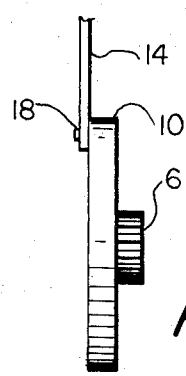
FIG. 4
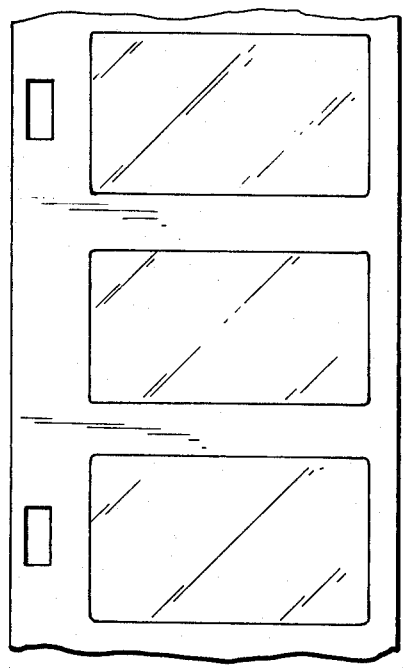
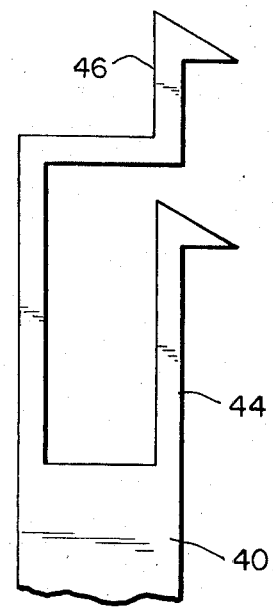
FIG. 6
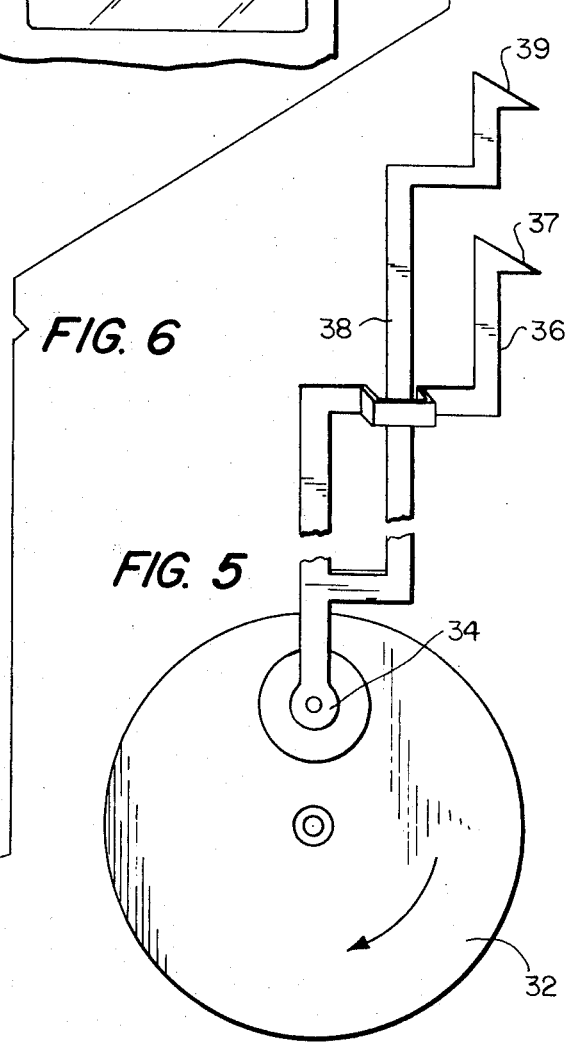
FIG. 5
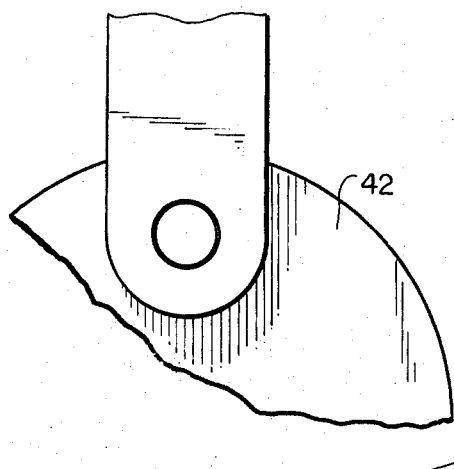

WIDE SCREEN FORMAL SUPER 8 MOTION PICTURE SYSTEM

BACKGROUND OF THE INVENTION

1. Field of the Invention

This invention relates to a wide screen format Super 8mm motion picture system and more particularly to a wide screen format Super 8 motion picture system which uses standard Super 8 cartridges.

2. Description of the Prior Art

The criteria for Super 8 motion picture photography in terms of film size, frame size, borders, sprocket holes, etc. have been standardized by the American Society of Motion Picuture and Television Engineers, and USA standards PH 22, 157-1967, PH 22, 157-1971. Film of this nature is now available on the market in cartridges which are readily insertable into movie cameras. Each cartridge holds 50 feet of film which can be used to produce 3,600 frames.

Systems for using standard Super 8 film include a gear train driven by a power source that turns a shutter blade which opens to expose the film. A mechanical system translates the rotary motion of the gear train into an up-down intermittent motion to operate a single pull-down claw. This pull-down claw engages a sprocket hole in the film and pulls the film down exactly one frame. While the shutter is open the claw is pushed back up and as the shutter closes, it again engages the sprocket hole and pulls the film down another frame.

The use of wide format systems is known as evidenced in U.S. Pat. Nos. 3,687,532; 3,637,297 and 3,583,803. All of the systems disclosed in these patents however require special cartridges having film specifically made for the system. Thus, these systems are not compatible with presently available Super 8 cartridges.

SUMMARY OF THE INVENTION

It is the object of this invention to provide a wide screen format Super 8 motion picture system which doubles the running time of a standard Super 8 cartridge.

It is another object of this invention to provide a Super 8mm motion picture system which doubles the running time of the film and is compatible with standard commercially available Super 8 film cartridges in which the running length of the film is doubled and a wide screen format is produced. The system incorporates two pull-down claws operating 180° out of phase with each other. Each claw pulls down the film only one half of the distance of conventional Super 8 systems. The shutter mechanism in the system is coordinated with the pull-down claws such that a frame is exposed after the operation of each pull-down claw. Thus, two exposures are made corresponding to two separate frames in the area which would normally be exposed to a single frame in a conventional Super 8 system.

BRIEF DESCRIPTION OF THE DRAWINGS

FIG. 1 illustrates a standard Super 8 film.

FIG. 2 illustrates one preferred embodiment of the present invention.

FIG. 3 shows the relationship of the frames in a conventional system and the system of the present invention.

FIG. 4 illustrates a side view in the supplementary gear used in the present invention.

FIG. 5 illustrates another preferred embodiment of the present invention.

FIG. 6 illustrates still another preferred embodiment of the present invention.

DESCRIPTION OF THE PREFERRED EMBODIMENTS

FIG. 1 illustrates a standard Super 8 film showing the dimension and location of the various portions. All dimensions are in inches.

Referring to FIG. 2, main gear 4 is driven by a motor (not shown). The main gear 4 has gear teeth 2 covering one quarter to one half of the circumference. Teeth 2 of the main gear engage teeth 6 and 8 on supplementary gears 10 and 12, respectively, during different portions of its rotation. The ratio of the gears is such that when teeth 2 engage teeth 6, for example, supplementary gear 10 is rotated a full 360°. Driving arms 14 and 16 are connected to supplementary gears 10 and 12, respectively, by means of rotating eccentric couplings 18 and 20. The driving arms are coupled to pull-down claws 22 and 24 through levers 26 and 28.

In operation as main gear 4 rotates in the clockwise direction as indicated by arrow x, teeth 2 engage teeth 6 of supplementary gear 10. This rotates the supplementary gear 10 in the counter-clockwise direction causing the vertical movement of driving arm 14. As driving arm 14 moves from the position shown on the drawing to its lower most vertical position, pull-down claw 22 is lowered to its lowermost vertical position. When pull-down claw 22 is in its uppermost position it engages a sprocket hole in film 23 positioned behind aperture plate 30. The lowering of pull-down claw 22 pulls the film down a corresponding distance. Then, as driving arm 14 returns to its uppermost position, the pull-down claw disengages the sprocket hole in the film and returns to the position shown in the figure. The distance the film 23 is pulled down is one half of the distance which it would be pulled in conventional Super 8 systems. After teeth 2 of main gear 4 have disengaged teeth 6 of supplementary gear 10 gear 4 continues to rotate in the clockwise direction until teeth 2 engage teeth 8 of supplementary gear 12. This then causes supplementary gear 12 to rotate in the counter-clockwise direction imparting vertical motion to pull-down claw 24. The pull-down claw 24 engages the same sprocket hole as was engaged by the other pull-down claw moving it half of the distance of the conventional Super 8 system.

aperture plate shutter operates in conjunction with the movement of the pull-down claws such that the film is exposed once through film aperture 28 in apertureplate 30 after the first pull-down claw has moved the film into position and then is exposed again after the second pull-down claw has moved the film into position.

In this embodiment the teeth 2 are positioned in one quadrant of main gear 4. Therefore the gear ratio is such that each pull-down claw goes through an entire cycle as the main gear goes through one quadrant. The shutter (not shown) will be closed during the entire cycle and will open when teeth 2 do not engage teeth 6 or 8. However, if teeth 2 are extended to two quadrants then the pull-down claw is pulled down while the shutter is closed and the pull-down claw returns while the shutter is open.

Since the same sprocket hole in the film is pulled down by each claw half of the distance in conventional systems and the film is exposed after each pull-down in the system of the present invention the film has two separate exposures in the area normally occupied by a single exposure in conventional systems. There is of course a small unexposed portion between each frame. Each exposure is of the same width as in a conventional system, but is only one half of the height. This not only provides twice the number of exposures, but also gives a wide screen format.

Referring to FIG. 3 film 23 is shown having frame areas A and B. In a conventional Super 8 system areas A and B are exposed and then hole 25 moves from position $a$ to position $c$. In the system of the present invention area A is exposed, pull-down claw 22 pulls sprocket hole 25 to position $b$ and then area B is exposed, after which pull-claw 24 pulls sprocket hole 25 to position $c$. Thus two frames are obtained in the same area occupied by a single frame in a conventional system. Each frame in this invention is the same width and half the height of a conventional frame. Due to the face that the height is one half the frame has a wide format.

FIG. 4 is a side view of the supplementary gears 10 or 12. As can be seen, the rotary eccentric coupling 18 is on the opposite side of the supplementary gear as the teeth 6. This prevents the interference of the rotary eccentric coupling with the main gear as the rotary eccentric coupling rotates through 360°.

FIG. 5 illustrates an alternate embodiment of the present invention. A main drive wheel or means 32 is driven in the clockwise direction by a motor (not shown). As the main drive means 32 is rotated, eccentric coupling 34 follows a circular path. This path moves pull-down claws 36 and 38 in the vertical direction. The distance between points 37 and 39 at the ends of the pull-down claws is equal to one half of the distance between sprocket holes in a standard Super 8 film. During one rotation of main drive means 32 the sprocket hole is engaged by point 39 and will be pulled down to a position which is adjacent to the location of point 37 in the drawing. During this same rotation point 37 does not engage a sprocket hole and thus, the point merely moves down and then up in a vertical direction. During a second rotation of main drive means 32 point 37 engages the sprocket hole and moves it one half of the distance of the standard Super 8 film. During the next rotation of drive means 32 point 39 again engages a sprocket hole and so on. It can be seen therefore, that in this arrangement on the down-stroke point 37 moves the film a distance equal to one half of the length of a standard Super 8 frame and then during the upward movement the film is exposed. During the next rotation of main drive means 32, point 39 moves the film another half distance of the standard Super 8 frame and the film is exposed during the upward movement.

FIG. 6 illustrates still another embodiment of the present invention which is similar to that shown in FIG. 5. In this arrangement an arm 40 is coupled to a main drive means 42 which rotates in the clockwise direction. Pull-down claws 44 and 46 are integrally formed as part of arm 40. This arrangement operates in the same manner as that described above with respect to FIG. 5. In other words, a frame having the length of a standard super 8 frame is exposed for each rotation of main drive means 42. Thus it is exposed twice in the area occupied by a standard Super 8 frame.

The system of the present invention requires the modification of standard Super 8 systems to provide two pull-down claws operating 180° out of phase such that the system is compatible with standard commercially available Super 8 film cartridges. This provides twice the running length of the film along with the added feature of a wide screen format. The wide screen format is achieved because the width of the frame is the same as a standard Super 8 frame but the height is one half.

While the invention has been particularly shown and described with reference to a preferred embodiment thereof, it will be understood by those skilled in the art that various changes in form and details may be made therein without departing from the scope of the invention.

What is claimed is:

1. A super 8 motion picture system which is compatible with a conventional Super 8 cartridge comprising:
   a. a pull down claw means comprising a body member having first and second claw members integral with said body member, said claw members spaced longitudinally on said body member and separated from each other by a distance equal to one half the distance between sprocket holes of a Super 8 film for engaging a film in said cartridge and pulling said film wherein each claw member pulls the film the distance of one half of a conventional Super 8 frame;
   b. drive means directly coupled to said pull down claw means, said drive means comprising a drive wheel and means mounting said body member eccentrically on said drive wheel such that for each revolution of said drive wheel said claw means travels a distance equal to one half the distance between sprocket holes of a Super 8 film and returns; and,
   c. shutter means coordinated with said pull down claw means for exposing said film after it has been pulled by one of said claw members, whereby each frame of said film covers one half of the area of a frame in a conventional Super 8 film thereby doubling the running time of the film and creating a wide format frame.

2. The system of claim 1 wherein said claw members each comprise an arm extending from a side of said body member and a claw at the end of each arm.

3. The system of claim 2 wherein one arm includes a portion perpendicular to the other arm such that said claws are aligned along an axis parallel to said other arm.

* * * * *